(12) United States Patent
Kubota et al.

(10) Patent No.: US 8,163,202 B2
(45) Date of Patent: Apr. 24, 2012

(54) (OXY) NITRIDE PHOSPHOR, WHITE LIGHT-EMITTING DEVICE INCLUDING THE (OXY) NITRIDE PHOSPHOR, METHOD OF PREPARING PHOSPHOR, AND NITRIDE PHOSPHOR PREPARED BY THE METHOD

(75) Inventors: Shunichi Kubota, Suwon-si (KR); Young-sic Kim, Seoul (KR); Seoung-jae Im, Seoul (KR); Tae-gon Kim, Seoul (KR)

(73) Assignee: Samsung Electro-Mechanics Co., Ltd. (KR)

( * ) Notice: Subject to any disclaimer, the term of this patent is extended or adjusted under 35 U.S.C. 154(b) by 748 days.

(21) Appl. No.: 12/194,801

(22) Filed: Aug. 20, 2008

(65) Prior Publication Data

US 2009/0051269 A1 Feb. 26, 2009

(51) Int. Cl.
*C09K 11/59* (2006.01)
*H01L 33/00* (2010.01)
(52) U.S. Cl. .......... 252/301.4 F; 313/486; 313/503; 257/98
(58) Field of Classification Search .......... 252/301.4 F; 313/486, 503; 257/98
See application file for complete search history.

(56) References Cited

U.S. PATENT DOCUMENTS

2006/0001352 A1\* 1/2006 Maruta et al. ............. 313/486
2006/0124947 A1\* 6/2006 Mueller et al. ............ 257/98

FOREIGN PATENT DOCUMENTS

KR 1020010101761 A 11/2001
KR 1020060109431 A 10/2006

OTHER PUBLICATIONS

Korean Office Action with English Translation for Application 10-2008-0081377 dated Oct. 25, 2010.

\* cited by examiner

*Primary Examiner* — Carol M Koslow
(74) *Attorney, Agent, or Firm* — Cantor Colburn LLP

(57) ABSTRACT

Provided is an (oxy)nitride phosphor, which is a compound represented by Formula 1 below:

$$\{M_{(1-x)}Eu_x\}_a Si_b O_c N_d \qquad \text{<Formula 1>}$$

wherein,
M is an alkaline earth metal; and
$0<x<1$, $1.8<a<2.2$, $4.5<b<5.5$, $0\leq c<8$, $0<d\leq 8$, and $0<c+d\leq 8$. The (oxy)nitride phosphor produces red light suitable for use in UV-LED and blue-LED type white light-emitting devices and achieves good efficiency.

19 Claims, 10 Drawing Sheets

PRIMARY SINTERING

IN AIR  300~700°C

(OXY) NITRIDE PHOSPHOR, WHITE LIGHT-EMITTING DEVICE INCLUDING THE (OXY) NITRIDE PHOSPHOR, METHOD OF PREPARING PHOSPHOR, AND NITRIDE PHOSPHOR PREPARED BY THE METHOD

This application claims priority to Korean Patent Application Nos. 10-2007-0084030, filed on Aug. 21, 2007, 10-2007-0112306, filed on Nov. 5, 2007 and 10-2008-0050995, filed on May 30, 2008, in the Korean Intellectual Property Office, and all the benefits accruing therefrom under 35 U.S.C. §119, the contents of which are incorporated herein in their entirety by reference.

BACKGROUND OF THE INVENTION

This disclosure relates to an (oxy)nitride phosphor, a white light-emitting device including the (oxy)nitride phosphor, and a method of preparing a nitride phosphor.

Conventionally, fluorescent lamps and incandescent lamps are widely used as sources of luminescence. However, mercury (Hg) used in fluorescent lamps causes environmental problems and hence is not desirable. Moreover, these conventional sources of luminescence are not suitable for power saving due to their very short lifetimes and very low efficiencies. Thus, much recent research has been conducted to improve the efficiency of white light-emitting devices.

White light-emitting devices can produce white light by exciting three primary color (red, green, and blue) phosphors using a UV light-emitting diode (UV-LED) as a light source, by exciting red and green phosphors using a blue-LED as a light source, or by exciting a yellow phosphor using a blue-LED as a light source.

Among these three methods, the method of producing white light by exciting a yellow phosphor using a blue-LED as a light source leads to poor color reproduction due to the low intensity of red light.

Thus, research has been increasingly conducted to develop luminescence systems based on the other methods of producing white light by exciting phosphors using UV- and blue-LEDs. These methods can provide good color reproduction but display a low efficiency.

Meanwhile, commonly known red phosphors are not suitable for use in white light-emitting devices. These red phosphors exhibit good emission efficiency with respect to cathode rays, VUV (vacuum ultraviolet) rays, and short wavelength light, but poor emission efficiency with respect to UV and blue light when used in white light-emitting devices. Thus, in the technical field of white light-emitting devices, the development of red phosphors having high efficiency with respect to UV and blue light is strongly needed.

Under these circumstances, some nitride phosphors have been developed. The nitride phosphors emit light under UV and blue light, but the intensity of light is not sufficient to be commercially available for white light-emitting devices. Nitride phosphor preparation methods known hitherto use process conditions of high temperatures and high nitrogen gas pressures (0.1 MPa or more). Thus, a special apparatus designed to withstand high temperatures and high pressures is desirable. Moreover, unstable materials are used as starting materials, and thus, the stringency of conditions used to handle the starting materials increases. As such, red phosphors suitable for commercial production have not yet been developed.

SUMMARY OF THE INVENTION

Disclosed herein is an (oxy)nitride phosphor, which is a red phosphor.

Disclosed herein too is a white light-emitting device including the (oxy)nitride phosphor.

Disclosed herein too is a method of preparing a phosphor under stable and mild conditions.

Disclosed herein is an (oxy)nitride phosphor, which is a compound represented by Formula 1 below:

<Formula 1> wherein, M is an alkaline earth metal; and $0<x<1$, $1.8<a<2.2$, $4.5<b<5.5$, $0\leq c<8$, $0<d\leq 8$, and $0<c+d\leq 8$.

The (oxy)nitride phosphor is the compound of Formula 1, and may have pores.

Disclosed too is a white light-emitting device including a UV light-emitting diode (UV-LED); and the above-described (oxy)nitride phosphor.

Disclosed is a method of preparing a phosphor, the method including mixing an alkaline earth metal precursor compound, an Eu precursor compound, an acid, $Si_3N_4$ powder, and a cheated compound to form a gel-phase product; drying the gel-phase product; sintering the gel-phase product in a primary sintering process to form a sintered product; and pulverizing the sintered product; and sintering the sintered product in a secondary sintering process.

BRIEF DESCRIPTION OF THE DRAWINGS

The above and other features and advantages of the disclosed embodiments will become more apparent by describing in detail exemplary embodiments thereof with reference to the accompanying drawings in which.

DETAILED DESCRIPTION OF THE INVENTION

Hereinafter, disclosed embodiments will now be described more fully with reference to the accompanying drawings, in which exemplary embodiments are shown.

It will be understood that when an element is referred to as being "on" another element, it can be directly on the other element or intervening elements may be present therebetween. In contrast, when an element is referred to as being "disposed on" or "formed on" another element, the elements are understood to be in at least partial contact with each other, unless otherwise specified.

The terminology used herein is for the purpose of describing particular embodiments only and is not intended to be limiting of the invention. As used herein, the singular forms "a", "an" and "the" are intended to include the plural forms as well, unless the context clearly indicates otherwise. The use of the terms "first", "second", and the like do not imply any particular order but are included to identify individual elements. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements and the thicknesses of layer and regions are exaggerated for clarity.

According to an exemplary embodiment, an (oxy)nitride phosphor is provided. The (oxy)nitride phosphor comprises a compound represented by Formula 1 below:

$$\{M_{(1-x)}Eu_x\}_a Si_b O_c N_d \qquad \text{<Formula 1>}$$

wherein, M is an alkaline earth metal; and $0<x<1$, $1.8<a<2.2$, $4.5<b<5.5$, $0\leq c<8$, $0<d\leq 8$, and $0<c+d\leq 8$.

In an exemplary embodiment, M may be Ba, Sr, or Ca.

In an exemplary embodiment, the (oxy)nitride phosphor may be a compound represented by:

$$\{M_{(1-x)}Eu_x\}_a Si_b O_c N_d$$

wherein, M is an alkaline earth metal; and $0<x<1$, $1.8<a<2.2$, $4.5<b<5.5$, $0<c<8$, $0<d\leq 8$, and $0<c+d\leq 8$.

In an exemplary embodiment, the (oxy)nitride phosphor may have pores.

The (oxy)nitride phosphor compound of Formula 1 is a red phosphor. The (oxy)nitride phosphor is a material that is excited under UV or blue light and emits red light with high efficiency. A UV light-emitting diode (UV-LED) or a blue-LED or both can be used as excitation sources in a white light-emitting device including the (oxy)nitride phosphor of Formula 1.

The (oxy)nitride phosphor of Formula 1 solves various problems of conventional red phosphors. For example, the (oxy)nitride phosphor of Formula 1 has a very high thermal activation energy related to quenching because a light emission activator binds with nitrogen, thus reducing emission loss for red light and resulting in high red light-emission efficiency. Moreover, the (oxy)nitride phosphor solves the problems of conventional red phosphors, such as sensitivity to moisture in air, an undesired reaction with a binder, and poor thermal durability. Therefore, the (oxy)nitride phosphor can be used to improve a white light-emitting device.

The (oxy)nitride red phosphor is very suitable for use in white light-emitting devices including red, green, and blue phosphors, and which uses a UV-LED as the light source. In addition, the (oxy)nitride red phosphor can be used in white light-emitting devices including red and green phosphors, and which uses a blue-LED as a light source. Such white light-emitting devices having the (oxy)nitride phosphor can realize good white light and high efficiency.

The (oxy)nitride phosphor can produce red light with high sensitivity to human eyes.

According to an exemplary embodiment, the (oxy)nitride phosphor may have pores. In a process of preparing the (oxy)nitride phosphor having pores, active nitrogen (N*) is permeated into the pores, thereby causing a nitridation reaction. When the (oxy)nitride phosphor is synthesized to have pores, smooth gas inflow and outflow occurs via the pores. Accordingly, the pores play a positive role in the process of synthesizing the (oxy)nitride phosphor, in view of the nitridation reaction that occurs in the pores.

In an exemplary embodiment, the average diameter of the pores may be in a range of about 0.6 μm or less. In another exemplary embodiment, the average diameter of the pores may be in a range of about 0.2 to about 0.6 μm. When the average diameter of the pores is less than about 0.2 μm, the amount of active nitrogen that can enter the phosphor may be small. In the process of preparing the (oxy)nitride phosphor having pores, active nitrogen (N*) is permeated into the pores, causing the nitridation reaction. Thus, when the average diameter of the pores is less than about 0.2 μm, this nitridation reaction may not be sufficiently performed. On the other hand, when the average diameter of the pores is greater than about 0.6 μm, the density of the phosphor is reduced, and light emission intensity may consequently be decreased.

In addition, according to an exemplary embodiment, the (oxy)nitride phosphor may include about 0.01 or less pores per unit area (1 μm²). In another exemplary embodiment, the (oxy)nitride phosphor may include about 0.005 to about 0.01 pores per unit area (1 μm²). When the number of the pores per unit area (1 μm²) of the (oxy)nitride phosphor is less than about 0.005, the amount of active nitrogen that can enter the phosphor may be small. As described above, in the process of preparing the (oxy)nitride phosphor having pores, the active nitrogen is permeated into the pores, causing the nitridation reaction. Therefore, when the number of the pores is less than about 0.005, this reaction may not be sufficiently performed. When the number of the pores per unit area (1 μm²) of the (oxy)nitride phosphor is greater than about 0.01, the density of the phosphor is reduced, and thus light emission intensity may be decreased.

According to an exemplary embodiment, the average distance between the pores may be in a range of about 1 μm or greater. In another exemplary embodiment, the average distance between the pores may be in a range of about 1 μm to about 3 μm. When the average distance between the pores is less than about 1 μm, the density of the phosphor is reduced, and thus light emission intensity may be decreased. When the average distance between the pores is greater than about 3 μm, the amount of active nitrogen that can enter the phosphor may be small. As described above, in the process of preparing the (oxy)nitride phosphor having pores, the active nitrogen is permeated into the pores, causing the nitridation reaction.

Thus, when the average diameter of the pores is greater than about 3 μm, this nitridation reaction may not sufficiently be performed.

The pores may have various cross-sectional shapes. The pores may have a circular, elliptical, square, rectangular, polygonal cross-section or a combination comprising at least one of the foregoing shapes.

According to an exemplary embodiment, the (oxy)nitride phosphor compound of Formula 1 may be $\{Sr_{(1-x)}Eu_x\}_aSi_bO_cN_d$ where $0<x\leq0.1$, $1.8<a<2.2$, $4.5<b<5.5$, $0\leq c<8$, $0<d\leq 8$, and $0<c+d\leq 8$, preferably $\{Sr_{(1-x)}Eu_x\}_2Si_5N_8$ where $0<x\leq 0.1$.

In another exemplary embodiment, the compound of Formula 1 may be a compound such as $(Sr_{1-x}Eu_x)_2Si_5N_8(0<x<1)$, $(Sr_{1-x}Eu_x)_{1.99}Si_5N_8(0<x<1)$, $(Ba_{1-x-y}Sr_xEu_y)_2Si_5N_8(0<x<1, 0<y<1,$ and $0<x+y<1)$, $(Sr_{1-x-y}Ca_xEu_y)_2Si_5N_8(0<x<1, 0<y<1,$ and $0<x+y<1)$, or $(Ba_{0.5}Sr_{1-x}Ca_{0.5}Eu_x)Si_5N_8 (0<x<1)$.

According to an exemplary embodiment, a white light-emitting device is provided. The white light-emitting device includes a UV-LED and an (oxy)nitride phosphor above-described. The (oxy)nitride phosphor may have pores.

The UV-LED is an excitation source emitting electromagnetic radiation in the ultra-violet or near-ultraviolet region of the electromagnetic spectrum.

In the white light-emitting device, the excitation wavelength of the UV-LED ranges from about 390 to about 460 nm.

According to an exemplary embodiment, the white light-emitting device may further include at least one phosphor selected from a blue phosphor, a green phosphor, or a combination comprising at least one of a blue phosphor or a green phosphor.

The blue phosphor may be $(Sr,Ba,Ca)_5(PO_4)_3Cl:Eu^{2+}$; $BaMg_2Al_{16}O_{27}:Eu^{2+}$; $Sr_4Al_{14}O_{25}:Eu^{2+}$; $BaAl_8O_{13}:Eu^{2+}$; $(Sr,Mg,Ca,Ba)_5(PO_4)_3Cl:Eu^{2+}$; $BaMgAl_{10}O_{17}:Eu^{2+}$; $Sr_2Si_3O_8 2SrCl_2:Eu^{2+}$; or a mixture of two or more thereof.

The green phosphor may be $(Ba,Sr,Ca)_2SiO_4:Eu^{2+}$; $Ba_2MgSi_2O_7:Eu^{2+}$; $Ba_2ZnSi_2O_7:Eu^{2+}$; $BaAl_2O_4:Eu^{2+}$; $SrAl_2O_4:Eu^{2+}$; $BaMgAl_{10}O_{17}:Eu^{2+}$, $Mn^{2+}$; $BaMg_2Al_{16}O_{27}:Eu^{2+}$, $Mn^{2+}$; or a mixture of two or more thereof.

The emission peak wavelength of the (oxy)nitride phosphor may be about 610 to about 650 nm.

The emission peak wavelength of the green phosphor may be about 510 to about 560 nm.

The emission peak wavelength of the blue phosphor may be about 440 to about 460 nm.

According to an exemplary embodiment, a white light-emitting device is provided, which includes: a blue light emitting diode (LED); and an (oxy)nitride red phosphor as above-described.

The blue-LED may be used as an excitation light source, and may have a wavelength ranging from about 420 to about 480 nm.

In an exemplary embodiment, the white light-emitting device may further include a green phosphor.

Examples of the green phosphor include $(Ba,Sr,Ca)_2SiO_4:Eu^{2+}$; $Ba_2MgSi_2O_7:Eu^{2+}$; $Ba_2ZnSi_2O_7:Eu^{2+}$; $BaAl_2O_4:Eu^{2+}$; $SrAl_2O_4:Eu^{2+}$; $BaMgAl_{10}O_{17}:Eu^{2+}$, $Mn^{2+}$; $BaMg_2Al_{16}O_{27}:Eu^{2+}$, $Mn^{2+}$, and a mixture of two or more thereof.

The emission peak wavelength of the (oxy)nitride phosphor may be about 610 to about 650 nm.

The emission peak wavelength of the green phosphor may be about 510 to about 560 nm.

Figure 1:
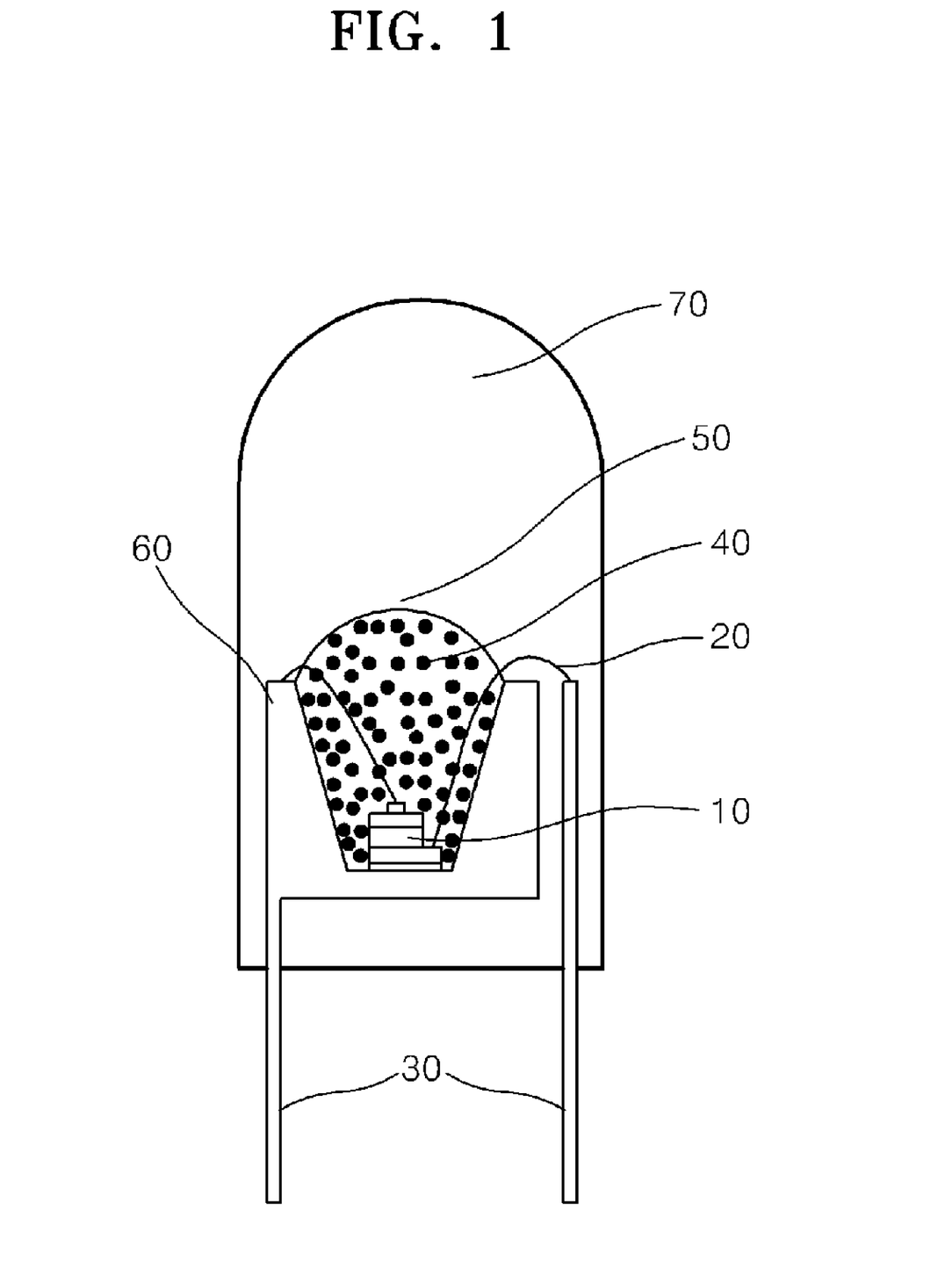
FIG. 1 is a schematic view illustrating the structure of a white light-emitting device according to an exemplary embodiment of the present invention.

FIG. 1 is a schematic view illustrating the structure of a white light-emitting device according to an embodiment of the present invention. FIG. 1 illustrates a polymer lens type, surface-mounted LED.

Referring to FIG. 1, a UV LED chip 10 is die-bonded to an electric lead line 30 via a gold wire 20, and an epoxy mold layer 50 is formed on the UV LED chip 10. The epoxy mold layer 50 is held inside a mold 60. The epoxy mold layer 50 contains a phosphor composition 40 including an (oxy)nitride phosphor as above-described. A reflective film (not shown) of aluminum or silver is formed on an inner surface of the mold 60. The reflective film serves to reflect light upward from the UV LED chip 10.

A polymer lens 70 is formed above the epoxy mold layer 50. In an exemplary embodiment, the polymer lens 70 may be an epoxy dome lens, as illustrated in FIG. 1. The shape of the epoxy dome lens 70 may be changed according to a desired orientation angle.

The UV-LED used in the white light-emitting device is not limited to the structure illustrated in FIG. 1. Other structures, e.g., a phosphor-mounted LED, a lamp-type LED, and a PCB-type surface-mounted LED may also be used.

The (oxy)nitride phosphor of Formula 1 of the present invention can be applied to a lamp such as a mercury lamp or a xenon lamp, or a self-emission liquid crystal display (LCD), in addition to a light-emitting device as described above.

According to an exemplary embodiment, a method of preparing a phosphor is provided. The method includes mixing an alkaline earth metal precursor compound, an Eu precursor compound, an acid, $Si_3N_4$ powder, and a chelate compound to form a gel-phase product; drying the gel-phase product; sintering the gel-phase product in a primary sintering process to form a sintered product; and pulverizing the sintered product; and sintering the sintered product in a secondary sintering process.

The method will now be described in more detail.

First, a first mixture of an alkaline earth metal precursor compound and an Eu precursor compound is prepared. The alkaline earth metal precursor compound may be a Ba precursor compound, a Sr precursor compound, a Ca precursor compound, or the like. For example, the Ba precursor compound comprises $BaCO_3$, $Ba(NO_3)_2$, $BaCl_2$, $BaO$, and the like, the Sr precursor compound is $SrCO_3$, $Sr(NO_3)_2$, $SrCl_2$, $SrO$, and the like, and the Ca precursor compound comprises $CaCO_3$, $Ca(NO_3)_2$, $CaCl_2$, $CaO$, and the like. The Eu precursor compound may comprise $Eu_2O_3$, $Eu(NO_3)_3$, $EuCl_3$, or the like.

Next, the first mixture of the alkaline earth metal precursor compound and the Eu precursor compound is dissolved in an acid to form a first solution. The acid that can be used herein may be an inorganic acid or an organic acid, e.g., $HNO_3$, $HCl$, $H_2SO_4$, acetic acid, butyric acid, palmitic acid, oxalic acid, or tartaric acid. According to an exemplary embodiment, the acid has a concentration of about 0.1 to about 10N.

Next, $Si_3N_4$ powder is added to the first solution to form a mixture of the first solution and the $Si_3N_4$ powder. The mixture of the first solution and the $Si_3N_4$ is termed the second solution.

Next, a chelate compound is added to the second solution to form a gel-phase product. For example, the chelate compound may be citric acid, glycine, urea, ethylenediaminetetraacetic acid (EDTA), or the like.

When the chelate compound is added, a $Sr^{2+}$-chelate compound and an $Eu^{3+}$-chelate compound are formed according to the following reaction schemes.

For example, the $Sr^{2+}$-chelate compound and the $Eu^{3+}$-chelate compound may be formed by using $SrCO_3$ as the alkaline earth metal precursor compound, $Eu_2O_3$ as the Eu precursor compound, nitric acid as the acid, and citric acid as the chelate compound. This can be represented by Reaction Scheme 1 below.

$SrCO_3+Eu_2O_3+HNO_3$+citric acid+$Si_3N_4$→$Sr^{2+}$-chelate compound+$Eu^{3+}$-chelate compound+$Si_3N_4$+ $NO_3^-$  <Reaction Scheme 1>

In more detail, the $Sr^{2+}$-chelate compound is formed by reacting $SrCO_3$ with nitric acid to form $Sr^{2+}$, followed by reaction with citric acid, as shown in the following Reaction Scheme 2.

$SrCO_3+HNO_3$→$Sr^{2+}+NO_3^-$ $Sr^{2+}+C_6H_8O_7$→"$Sr^{2+}$-chelate compound"  <Reaction Scheme 2>

Figure 5:
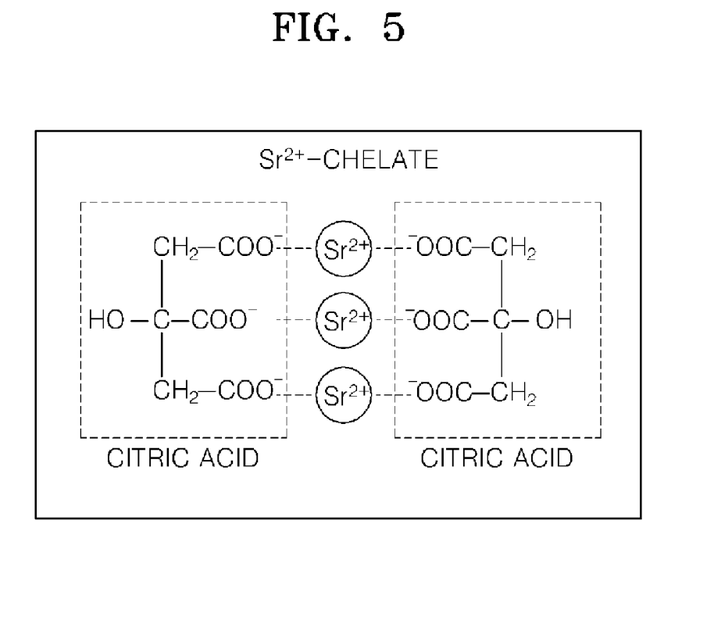
FIG. 5 illustrates the structural formula of a $Sr^{2+}$-chelate compound produced as an intermediate in a phosphor preparation method according to an exemplary embodiment of the present invention.

The $Sr^{2+}$-chelate compound thus-formed is illustrated in FIG. 5.

The $Eu^{3+}$-chelate compound is formed by reacting $Eu_2O_3$ with nitric acid to form $Eu^{3+}$ followed by reaction with citric acid, as shown in the following Reaction Scheme 3.

$Eu_2O_3+HNO_3$→$Eu^{3+}+NO_3^-$ $Eu^{3+}+C_6H_8O_7$→"$Eu^{3+}$-chelate compound"  <Reaction Scheme 3>

Figure 6:
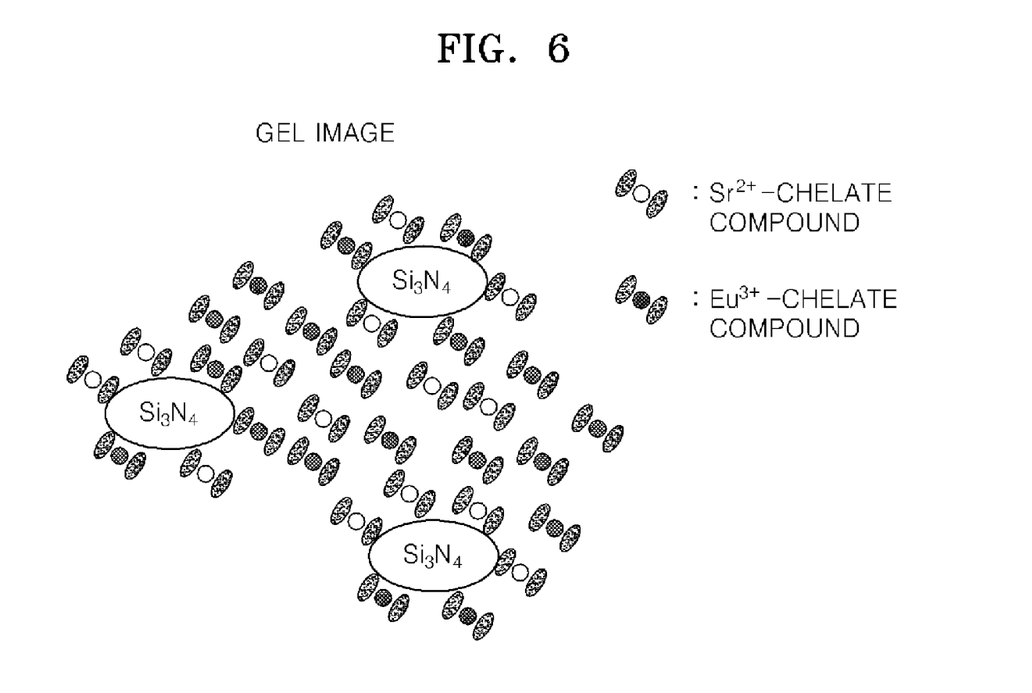
FIG. 6 is a schematic diagram illustrating a gel-phase product produced in a phosphor preparation method according to an exemplary embodiment of the present invention.

FIG. 6 illustrates a gel-phase product formed by the above-described procedure. Referring to FIG. 6, $Si_3N_4$ powder particles are distributed in the $Sr^{2+}$- and $Eu^{3+}$-chelate compounds. This means that $Sr^{2+}$-chelate compounds, $Eu^{3+}$-chelate compounds and $Si_3N_4$ powder particles are randomly distributed throughout the gel-phase product.

Next, the gel-phase product is dried and primarily sintered. In an exemplary embodiment, the primary sintering is performed at about 300 to about 700° C. in an air atmosphere for about 0.5 to about 5 hours. By the primary sintering, the alkaline earth metal chelate compound and the $Eu^{3+}$-chelate compound are oxidized to form alkaline earth metal oxide and $Eu_2O_3$. The resultant sintered product has a large number of pores due to $CO_2$ and $H_2O$ gases generated upon the oxidation.

Figure 7:
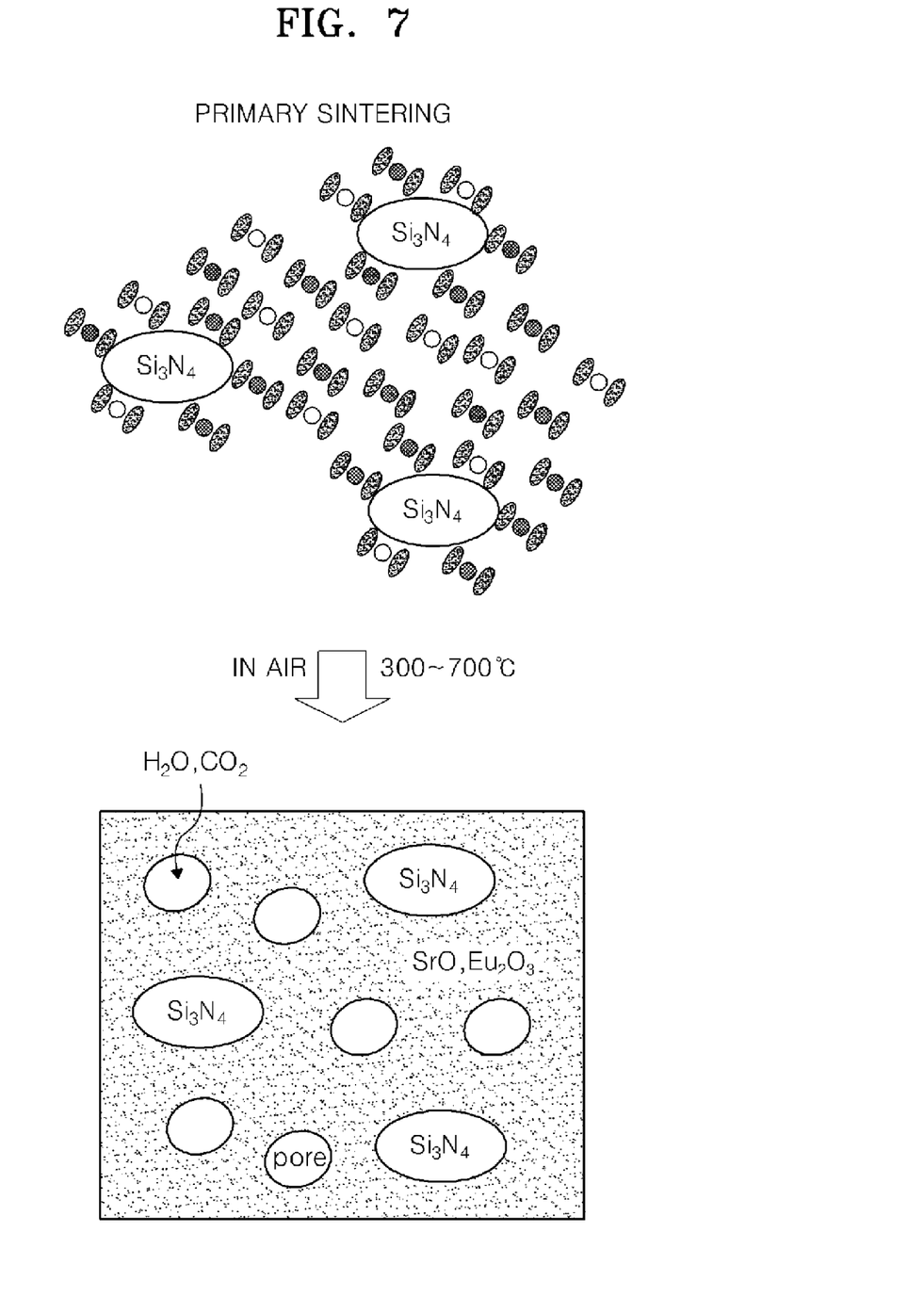
FIG. 7 is a schematic diagram illustrating the conversion of a gel-phase product into a sintered product by primary sintering in a phosphor preparation method according to an exemplary embodiment of the present invention.

FIG. 7 is a schematic diagram illustrating the conversion of the gel-phase product to a sintered product by primary sintering.

Next, the sintered product obtained by the primary sintering is pulverized and secondarily sintered. According to an exemplary embodiment, the secondary sintering may be performed at about 1,300 to about 1,700° C. under a $NH_3$ and/or $H_2/N_2$ mixed gas atmosphere for about 10 to about 100 hours to thereby form a nitride compound.

The secondary sintering under the $NH_3$ and/or $H_2/N_2$ mixed gas atmosphere will now be described in more detail. First, $NH_3$ or $N_2$ is dissociated at high temperature to form active nitrogen (N*).

Figure 8:
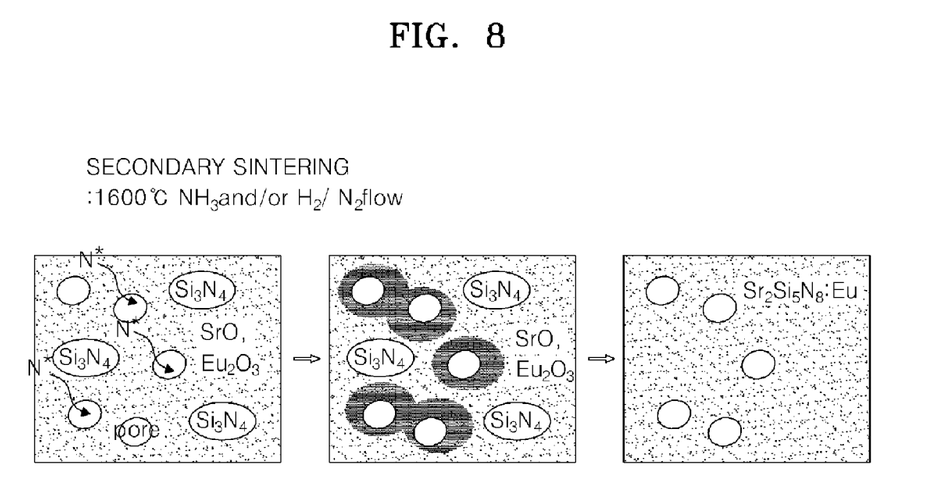
FIG. 8 is a schematic diagram illustrating the production of a phosphor by secondary sintering in a phosphor preparation method according to an exemplary embodiment of the present invention.

FIG. 8 illustrates the secondary sintering according to an exemplary embodiment of the present invention, in which Sr is used as an alkaline earth metal.

As illustrated in FIG. 8, the active nitrogen N* passes through the alkaline metal oxide and $Eu_2O_3$ into the pores. The pores provide a large active surface area where a nitridation reaction can occur. In the nitridation reaction, the active nitrogen is reacted with the alkaline metal oxide and the $Eu_2O_3$ to form a nitride. As the active surface area increases, the nitridation reaction is more effectively performed.

The primary sintering produces the alkaline earth metal oxide and the $Eu_2O_3$, which are reacted with N* during the secondary sintering, i.e., through the nitridation reaction, to produce alkaline earth metal nitride and $Eu_3N_2$ (here, reduction of $Eu^{3+}$ to $Eu^{2+}$ occurs). As described above, when Sr is used as the alkaline earth metal, the alkaline earth metal nitride is $Sr_3N_2$. The alkaline earth metal nitride and $Eu_3N_2$ as formed are unstable in air, but are stable under an environment according to the phosphor preparation method of the embodiment. After that, as illustrated in FIG. 8, the nitridation reaction continues outwards from the pores in such a way that the oxides are progressively transformed into nitrides, for example, transformation of SrO and $Eu_2O_3$ into $Sr_3N_2$ and $Eu_3N_2$ is propagated outwardly from the pore surface. For example, when Sr is used as the alkaline earth metal, the nitride phosphor may be represented by the formula $(Sr_{1-x}Eu_x)_2Si_5N_8$ (0<x<1).

Figure 9:
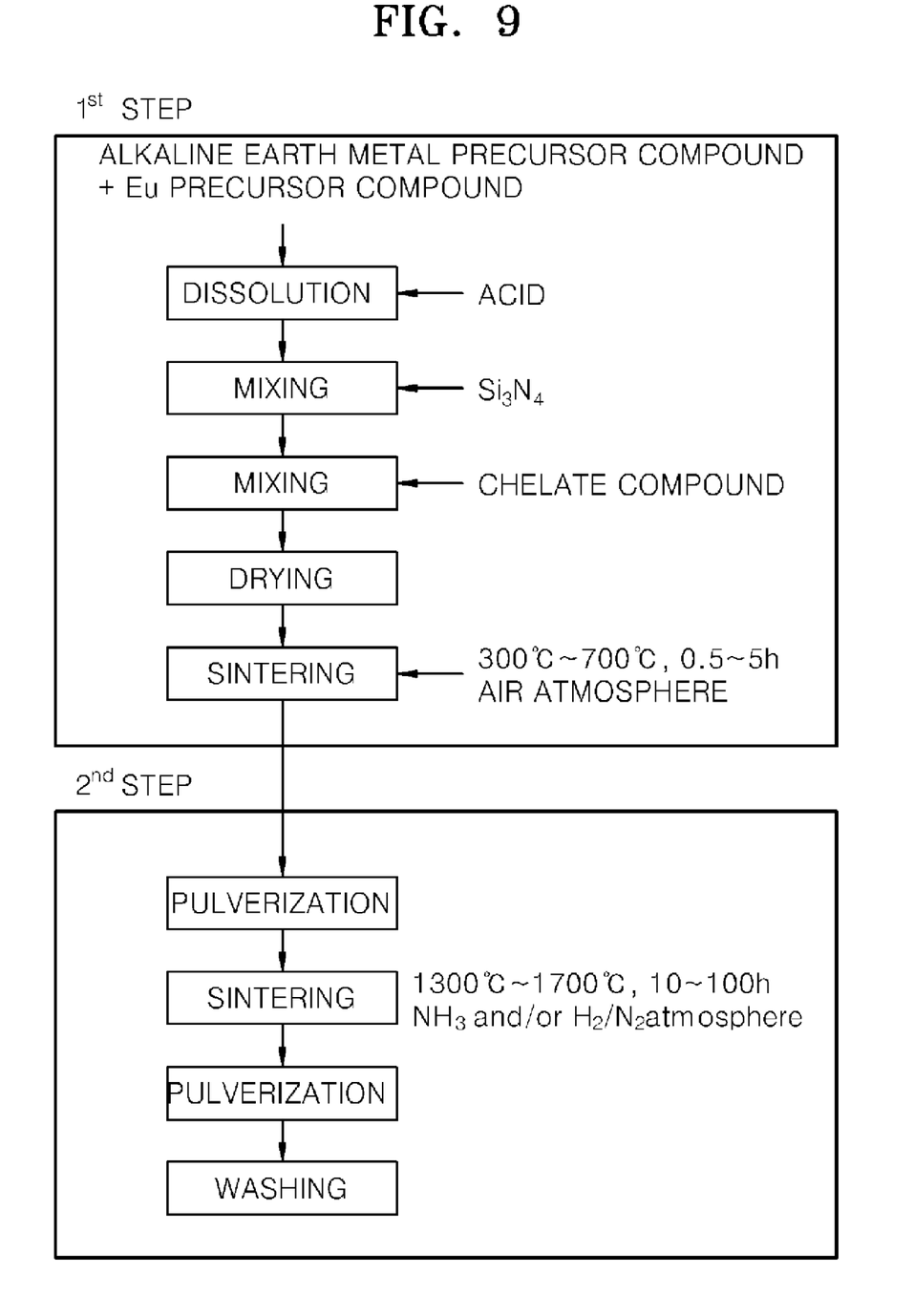
FIG. 9 is a schematic flow diagram illustrating a method of preparing a phosphor according to an exemplary embodiment of the present invention.

FIG. 9 is a schematic flow diagram illustrating a method of preparing a phosphor according to an embodiment of the present invention.

Figure 10:
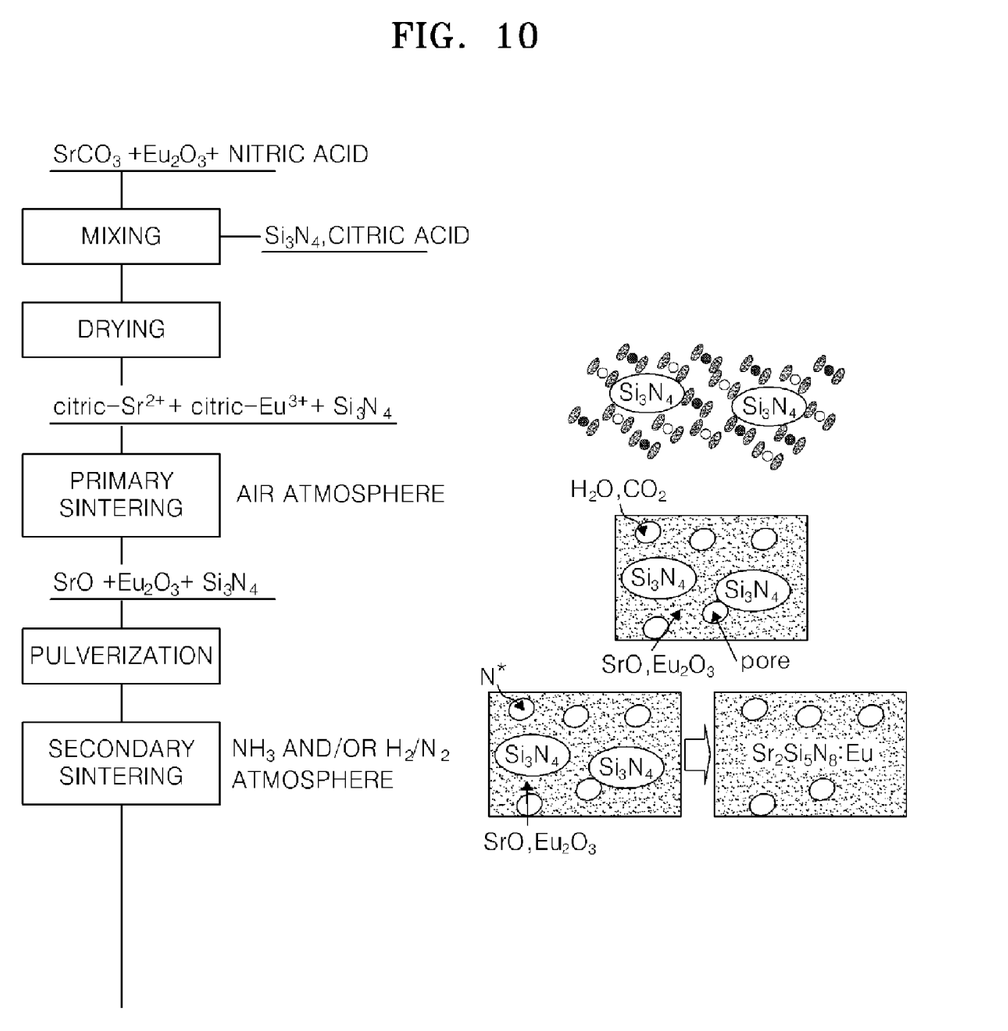
FIG. 10 is a schematic flow diagram illustrating the production of a phosphor using Sr as an alkaline earth metal and citric acid as an acid, according to an exemplary embodiment of a phosphor preparation method of the present invention.

FIG. 10 is a schematic flow diagram illustrating the production of a phosphor using Sr as an alkaline earth metal and a citric acid as an acid, according to an exemplary embodiment of the present invention.

In an exemplary embodiment, a product obtained by the secondary sintering may be further pulverized and sintered to obtain a nitride phosphor having good crystallinity. The further sintering may be performed at about 1,300 to about 1,700° C. under a $NH_3$ and/or $H_2/N_2$ mixed gas atmosphere for about 10 to about 100 hours.

Next, the resultant product may be washed to obtain a desired phosphor powder.

Figure 11:
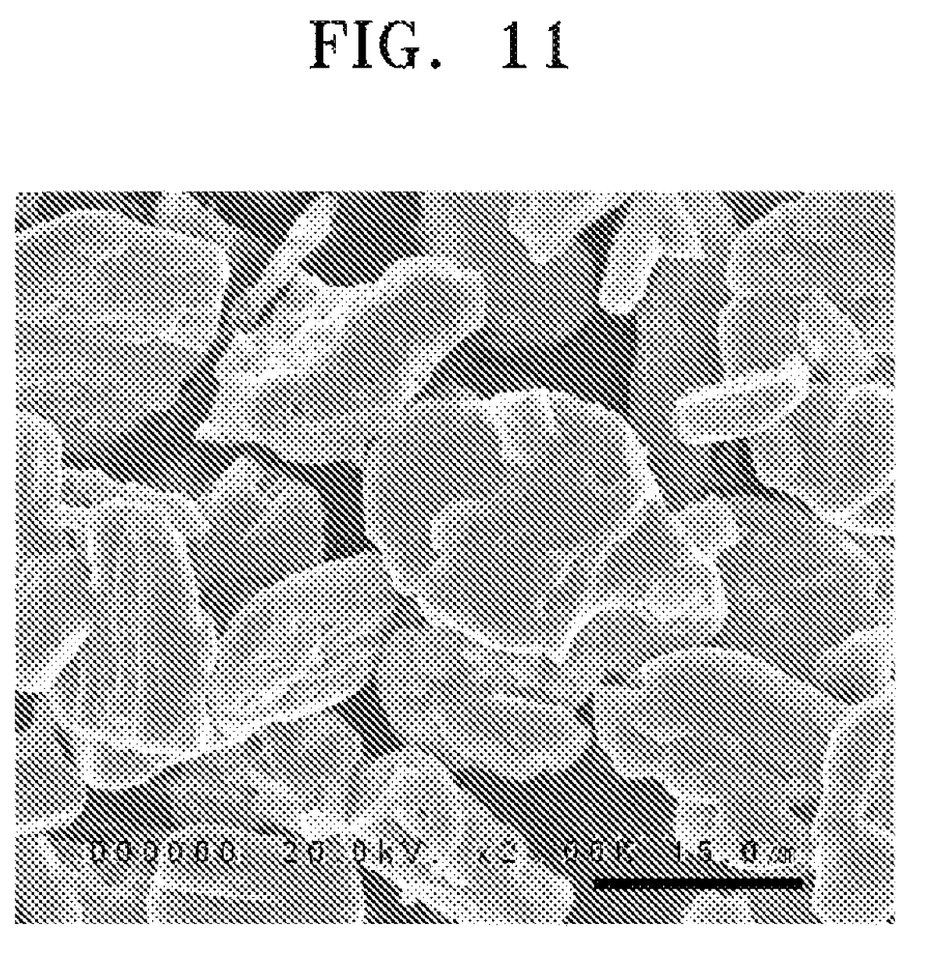
FIG. 11 is an SEM image of an (oxy)nitride phosphor according to an exemplary embodiment of the present invention.

FIG. 11 is an SEM image of an (oxy)nitride phosphor according to an exemplary embodiment of the present invention. As shown in FIG. 11, the (oxy)nitride phosphor has pores, wherein the average diameter of the pores is in a range of about 0.6 µm or less, a number of the pores is in a range of about 0.01 or less per unit area (1 µm²), an average distance between the pores is in a range of about 1 µm or greater, and the cross-sections of the pores is circular, elliptical, square, rectangular or polygonal.

The phosphor preparation method is particularly advantageous in the preparation of a nitride phosphor. That is, according to a conventional phosphor preparation method, some unstable nitrates are used as precursors. Thus, a special apparatus such as a glove box is required. On the other hand, in the phosphor preparation method of the embodiments disclosed herein, very stable powders such as Sr, Ba, Ca, and Eu precursors, e.g., carbonates or oxides such as $SrCO_3$, SrO, $Sr(NO_3)_2$, $SrCl_2$, $BaCO_3$, BaO, $Ba(NO_3)_2$, $BaCl_2$, $CaCO_3$, CaO, $Ca(NO_3)_2$, $CaCl_2$, $Eu_2O_3$, $Eu(NO_3)_3$, and $EuCl_3$ are used. $Si_3N_4$, which is stable in air, is used as a Si precursor, and thus, a special apparatus such as a glove box is not required.

As described above, the phosphor preparation method of the embodiment can be performed under lenient process conditions using stable starting materials, and thus, is very suitable for commercial applications. That is, the phosphor preparation method does not require a high temperature and a high pressure nitrogen atmosphere, unlike commonly known nitride-based phosphor preparation methods. Thus, it is not necessary to set high temperature and high pressure conditions and to use an apparatus specially designed to withstand the high temperature and high pressure conditions.

Moreover, the phosphor preparation method according to the present invention is environmentally friendly since materials causing environmental problems are not used.

The following examples are only for illustrative purposes and are not intended to limit the scope of the claimed invention.

EXAMPLES

Example 1

5.0 g of $SrCO_3$ and 0.06 g of $Eu_2O_3$ were dissolved in 10% nitric acid 100 cc, and 4.0 g of $Si_3N_4$ was then added thereto. The mixed solution was mixed with 4.8 g of citric acid, and the resultant solution was dried. The dried product was primarily sintered under an air atmosphere at 700° C. for one hour. The sintered product was pulverized into powder using an agate mortar. The powder was made into pellets. The pellets were placed in a crucible, and the crucible was then placed in an electrical furnace. The pellets were heated in the electrical furnace, together with carbon, up to 1,100° C. under an $NH_3$ atmosphere for 3 hours and then up to 1,600° C. under a 5% $H_2$ and 95% $N_2$ atmosphere for 5 hours. The carbon is involved to avoid the oxidation of nitride starting material. The resultant sintered product was pulverized into powder, and the powder was washed with distilled water and dried in an oven to give a phosphor sample 1 having the formula $((Sr_{0.99}Eu_{0.01})_2Si_5N_8)$.

Example 2

A phosphor sample 2 having the formula $((Sr_{0.98}Eu_{0.02})_2Si_5N_8)$ was prepared in the same manner as in Example 1 except that 5.0 g of $SrCO_3$ and 0.12 g of $Eu_2O_3$ as starting materials were dissolved in 10% nitric acid 100 cc.

Example 3

A phosphor sample 3 having the formula $((Sr_{0.97}Eu_{0.03})_2Si_5N_8)$ was prepared in the same manner as in Example 1 except that 5.0 g of $SrCO_3$ and 0.18 g of $Eu_2O_3$ as starting materials were dissolved in 10% nitric acid 100 cc.

Figure 2:
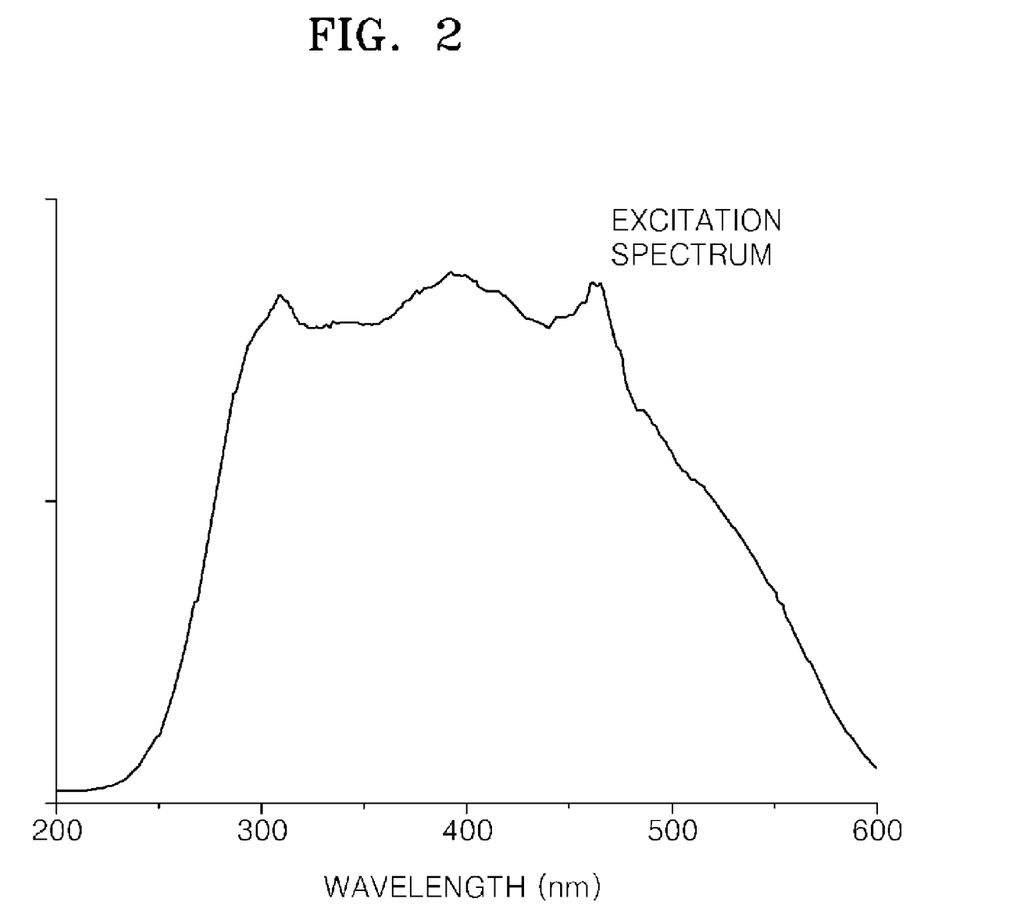
FIG. 2 illustrates an excitation spectrum of an (oxy)nitride phosphor according to an exemplary embodiment of the present invention.

FIG. 2 illustrates an excitation spectrum of the phosphor sample 1. Referring to FIG. 2, the phosphor sample 1 absorbs light having a wide range of wavelengths ranging from UV to blue light. This shows that both a UV-LED and a blue-LED can be used as excitation sources of a phosphor according to the present invention.

Figure 3:
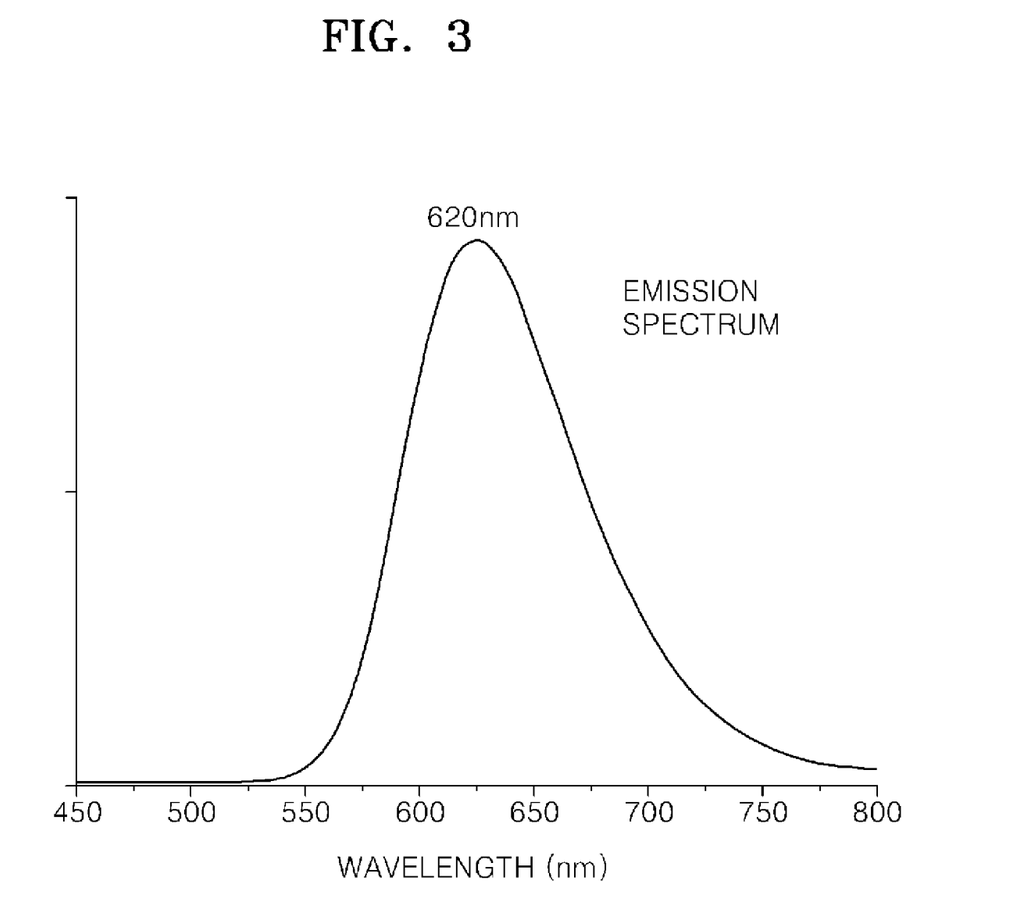
FIG. 3 illustrates an emission spectrum of an (oxy)nitride phosphor according to an exemplary embodiment of the present invention.

FIG. 3 illustrates an emission spectrum of the phosphor sample 1.

Figure 4:
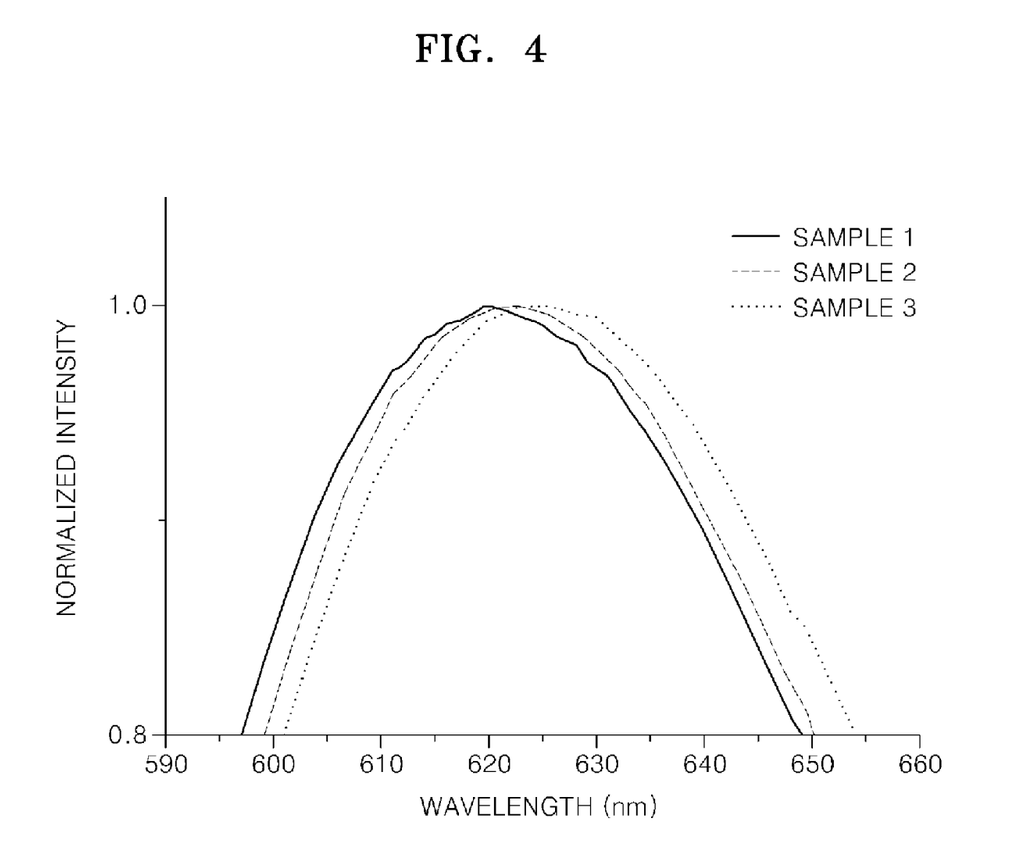
FIG. 4 illustrates emission spectra of (oxy)nitride phosphors according to exemplary embodiments of the present invention.

FIG. 4 illustrates emission spectra of the phosphor samples 1, 2, and 3. This shows that as a relative content of Eu to Sr increases, a peak wavelength increases.

The nitride phosphor according to the embodiment produces red light suitable for use in UV-LED and blue-LED type white light-emitting devices and achieves good efficiency. A phosphor preparation method according to the embodiment is performed under mild conditions using stable starting materials and is environmentally friendly, and thus, is useful for commercial applications. While disclosed embodiments have been shown and described with reference to exemplary embodiments thereof, it will be understood by those of ordinary skill in the art that various changes in form and details may be made therein without departing from the spirit and scope of the present invention as defined by the following claims.

In addition, many modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguished one element from another. Furthermore, the use of the terms a, an, etc. do not denote a limitation of quantity, but rather denote the presence of at least one of the referenced item.

What is claimed is:

1. An nitride phosphor having pores, the nitride phosphor comprising a compound represented by:

$$\{M_{(1-x)}Eu_x\}_a Si_b O_c N_d$$

wherein, M is an alkaline earth metal; and $0<x<1$, $1.8<a<2.2$, $4.5<b<5.5$, $0\leq c<8$, $0<d\leq 8$, and $0<c+d\leq 8$.

2. The nitride phosphor of claim 1, wherein the compound is $\{Sr_{(1-x)}Eu_x\}_a Si_b O_c N_d$ where $0<x\leq 0.1$, $1.8<a<2.2$, $4.5<b<5.5$, $0\leq c<8$, $0<d\leq 8$.

3. The nitride phosphor of claim 1, wherein the compound is $(Sr_{1-x}Eu_x)_2 Si_5 N_8$ where $0<x\leq 0.1$.

4. The nitride phosphor of claim 1, wherein the compound is $(Sr_{1-x}Eu_x)_2Si_5N_8$ ($0<x<1$), $(Sr_{1-x}Eu_x)_{1.99}Si_5N_8$ ($0<x<1$), $(Ba_{1-x-y}Sr_xEu_y)_2Si_5N_8$ ($0<x<1, 0<y<1, $ and $0<x+y<1$), $(Sr_{1-x-y}Ca_xEu_y)_2Si_5N_8$ ($0<x<1, 0<y<1$ and $0<x+y<1$) or $(Ba_{0.5}Sr_{1-x}Ca_{0.5}Eu_x)Si_5N_8$ ($0<x<1$).

5. The nitride phosphor of claim 1, wherein the average diameter of the pores is in a range of about 0.6 μm or less.

6. The nitride phosphor of claim 1, wherein a number of the pores is in a range of about 0.01 or less pores per unit area (1 $\mu m^2$).

7. The nitride phosphor of claim 1, wherein an average distance between the pores is in a range of about 1 μm or greater.

8. The nitride phosphor of claim 1, wherein the pores have a circular, elliptical, square, rectangular, polygonal cross-section or a combination comprising at least one of the foregoing cross-sections.

9. A white light-emitting device comprising:
   the nitride phosphor of claim 1; and
   an excitation source for exciting the nitride phosphor to emit white light.

10. The white light-emitting device of claim 9, wherein the excitation source is an ultraviolet emitting diode (UV-LED) or a blue light-emitting diode (LED).

11. The white light-emitting device of claim 9, further comprising at least one phosphor selected from the group consisting of a blue phosphor and a green phosphor.

12. The white light-emitting device of claim 11, wherein the emission peak wavelength of the oxynitride phosphor is about 610 to about 650 nm, the emission peak wavelength of the blue phosphor is about 440 to about 460 nm, and the emission peak wavelength of the green phosphor is about 510 to about 560 nm.

13. A method of preparing a phosphor, the method comprising:
   mixing an alkaline earth metal precursor compound, an Eu precursor compound, an acid, $Si_3N_4$ powder, and a chelate compound to form a gel-phase product;
   drying the gel-phase product;
   sintering the gel-phase product in a primary sintering process to form a sintered product; and
   pulverizing the sintered product; and
   sintering the sintered product in a secondary sintering process to produce a compound represented by:

$$\{M_{(1-x)}Eu_x\}_a Si_b O_c N_d$$

wherein, M is an alkaline earth metal; and $0<x<1$, $1.8<a<2.2$, $4.5<b<5.5$, $0\leq c<8$, $0<d\leq 8$, and $0<c+d\leq 8$.

14. The method of claim 13, wherein the mixing comprises mixing the alkaline earth metal precursor compound and the Eu precursor compound to form a first mixture; dissolving the first mixture in the acid to form a first solution; adding the $Si_3N_4$ powder to the first solution to form a second solution; and adding the chelate compound to the second solution to form the gel-phase product.

15. The method of claim 13, wherein the alkaline earth metal precursor compound comprises Sr precursor compound, Ba precursor compound, and Ca precursor compound.

16. The method of claim 13, wherein the Sr precursor compound is $SrCO_3$, $SrO$, $Sr(NO_3)_2$, or $SrCl_2$; the Ba precursor compound is $BaCO_3$, $BaO$, $Ba(NO_3)_2$, or $BaCl_2$; and the Ca precursor compound is $CaCO_3$, $CaO$, $Ca(NO_3)_2$, or $CaCl_2$.

17. The method of claim 13, wherein the Eu precursor compound is $Eu_2O_3$, $Eu(NO_3)_3$, or $EuCl_3$.

18. The method of claim 13, wherein the primary-sintering is performed at about 300 to about 700° C. under an air atmosphere for about 0.5 to 5 hours.

19. The method of claim 13, wherein the secondary-sintering is performed at about 1,300 to about 1,700° C. under a gas atmosphere selected from a $NH_3$ gas, a mixed gas of $H_2$ and $N_2$, and a mixed gas of $NH_3$, $H_2$, and $N_2$, for about 10 to about 100 hours.

* * * * *